Patented Jan. 1, 1924.

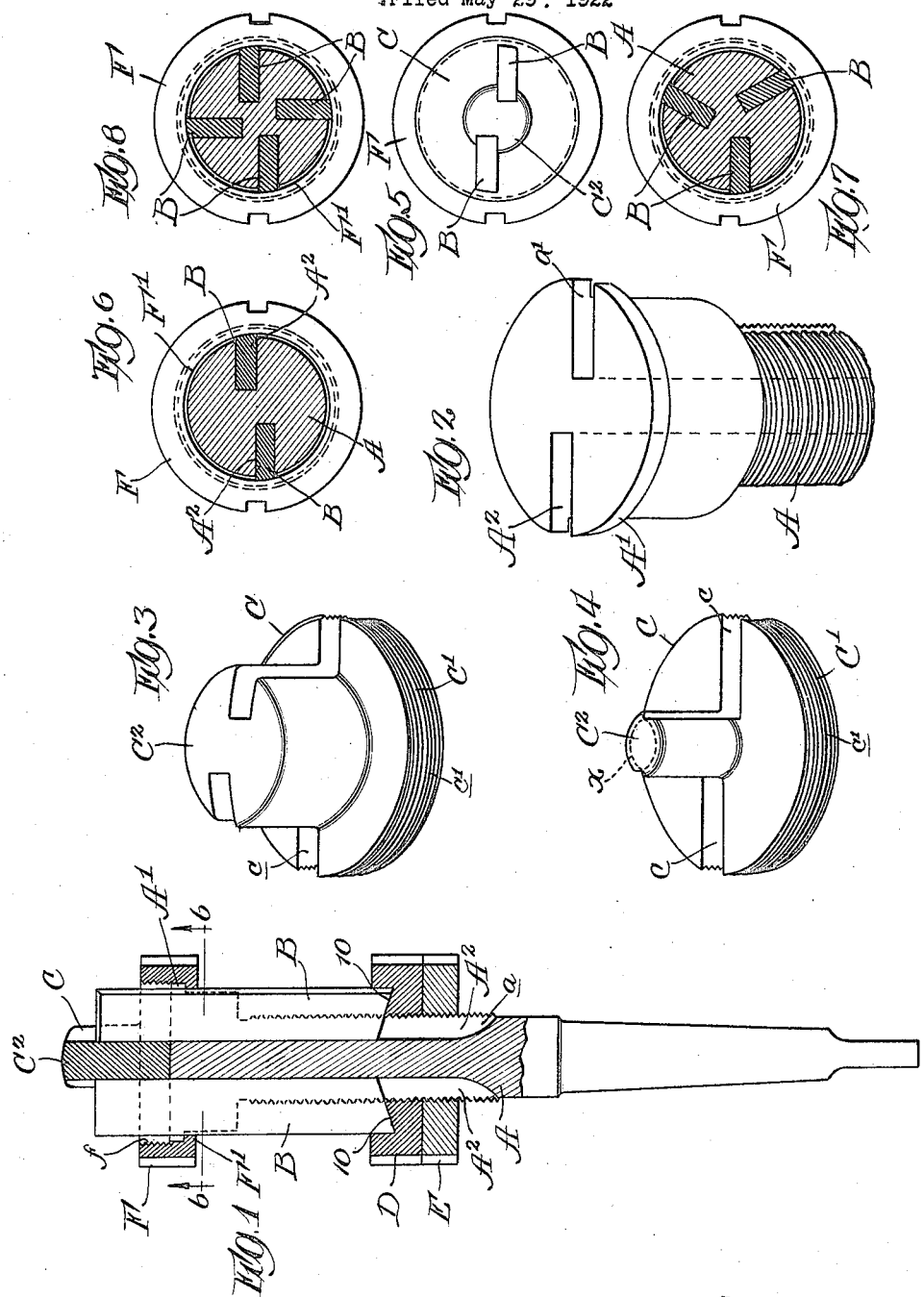

1,479,124

UNITED STATES PATENT OFFICE.

FRANK D. WINKLEY, OF CHICAGO, ILLINOIS.

COUNTERBORING OR COUNTERFACING TOOL.

Application filed May 29, 1922. Serial No. 564,413.

*To all whom it may concern:*

Be it known that I, FRANK D. WINKLEY, a citizen of the United States, residing in the city of Chicago, in the county of Cook and the State of Illinois, have invented certain new and useful Improvements in Counterboring or Counterfacing Tools, of which the following is a specification, reference being had to the accompanying drawings, forming a part thereof.

The purpose of this invention is to provide an improved counterboring and counterfacing tool adapted to be readily modified in respect to the diameter of the centering nipple, so as to operate accurately for its purpose in conterboring or counterfacing apertured bosses and the like, requiring the accurate centering of the tool with respect to the bore or aperture. It consists in the elements and features of construction shown and described, as indicated in the claims.

In the drawings:—

Figure 1 is an axial section of a tool embodying this invention.

Figure 2 is a perspective view of the tool stock or body with all separable parts removed.

Figure 3 is a perspective view of a centering terminal and coupler removed from the tool.

Figure 4 is a perspective view of a removable centering terminal having a smaller centering nipple.

Figure 5 is an end view or face view of of the tool completely assembled for functioning.

Figure 6 is a section at the line, 6—6, on Figure 1.

Figures 7 and 8 are views similar to Figure 5 showing tools having three and four cutters respectively.

The tool embodying this invention comprises a stem or body, A, having a terminal flange, $A^1$, longitudinal channels, $A^2$, for seating the cutters, B, and exteriorly threaded for a nut, D, which is adapted to constitute a stop for the inner or blind end, 10, of the cutters, B. E is a jam nut screwed onto the threaded stem back of the stop nut, D, for securing the same in adjusted position. The characteristic of the device consists of the formation of the stem with the terminal flange, $A^1$, for seating thereon a removable centering terminal, C, which is provided with a corresponding flange, $C^1$, and which is slotted as seen at $c$, coincidentally with the channels, $a$, of the stem or body, A, it being understood that said channels, $a$, extend as slots at $a^1$ in the terminal flange, $A^1$, of said stem or body, A, which slots, therefore, are to coincide with the slots, $c$, of the removable flange, $c^1$, centering terminal, C. F is a coupling for securing the removable terminal, C, to the stem or body, A, which is effected in the obvious manner of such coupling devices by the engagement of the interior flange, $F^1$, of the coupler A, behind the flange, $A^1$, of the stem or body, A, and the engagement of the interior thread, $f$, of the coupler F, with its peripheral thread, $c$, of the flange, $C^1$, of the terminal, C. It may be understood that removable centering terminals, C, may be made in sets the individuals of which vary in respect to the diameter of the centering nipple, $C^2$, conforming in all other respects to each other and adapted thereby to be interchangeably coupled to the same stem or body, A. And by this means the same tool with a plurality of interchangeable terminals may be readily and instantly adapted for counterboring or counterfacing about a considerably wide range of apertures differing in diameter. And it may be understood that the limits in respect to the diameter of the bore which may be counterfaced by the same tool are, as to minimums, the distance in diametric line between the channels for the cutters at opposite sides of the tool, indicated on Figure 4 by the circle, $x$, and as a maximum, said minimum diameter plus twice the width of the cutter, less a very small amount which the cutter should protrude beyond the circumference of the boss to avoid possibility of leaving a pin.

It may be understood that the two cutters may be clamped together for simultaneously grinding to insure perfect identity of length at all times, and so that their cutting ends will perfectly track in performing their work.

Also it will be understood that any desired number of cutters may be employed, the parts being provided with the corresponding number of grooves,—tools of larger diameter permitting the employment of a larger number of cutters, as three or four, as seen in Figures 7 and 8.

I claim:—

1. A counterboring or counterfacing tool, comprising a member in which the cutters are engaged for rotation, consisting of a main body constituting the stem or base of the tool, and a terminal separable from said stem or base, said separable terminal having a centering nipple and a peripheral flange which abuts transaxially on the end of the main body, and means engaging said flange and the main body for securing the latter and said terminal together.

2. In the construction defined in claim 1, foregoing, the main body having at the end on which the terminal seats, a peripheral flange, the means of securing the terminal to the main body being a coupler interiorly flanged for engaging the flange of one of said parts and interiorly threaded for engaging the flange of the other part.

3. In the construction defined in claim 1, foregoing, the main body or stem being longitudinally channeled for seating the cutters, and the flange of the terminal being slotted co-incidentally with the channels of the stem or body.

4. A counterboring or counterfacing tool comprising in combination with an exteriorly-threaded and terminally flanged stem longitudinally channeled for seating a plurality of cutters spaced apart about the axis of said stem; a nut on the threaded part of the stem adapted to form an endwise stop for the inner end of the cutter; a separable terminal comprising a centering nipple and a peripherally threaded transverse flange at its base adapted to seat on the end flange of the stem, and a coupler interiorly flanged for engaging behind the flange of the stem and interiorly threaded for screwing onto the flange of the centering terminal.

In testimony whereof, I have hereunto set my hand at Chicago, Illinois, this 27 day of May, 1922.

FRANK D. WINKLEY.